United States Patent [19]

Xie et al.

[11] Patent Number: 5,331,430
[45] Date of Patent: Jul. 19, 1994

[54] ELECTRONIC HIGH-FIDELITY SCREENLESS CONVERSION SYSTEM

[75] Inventors: Zhenhua Xie, Naperville; Michael A. Rodriguez, Palatine, both of Ill.

[73] Assignee: R.R. Donnelley & Sons Company, Lisle, Ill.

[21] Appl. No.: 775,334

[22] Filed: Oct. 11, 1991

[51] Int. Cl.$^5$ .......................... H04N 1/21; H04N 1/40
[52] U.S. Cl. ................................... 358/456; 358/458; 358/298
[58] Field of Search ............... 358/456, 458, 298, 296, 358/455, 448, 80, 75, 445, 447; 101/450.1, 453

[56] References Cited

U.S. PATENT DOCUMENTS

| | | | |
|---|---|---|---|
| 3,961,955 | 6/1976 | Gracia et al. | 101/450.1 |
| 4,350,996 | 9/1982 | Rosenfeld | 358/75 |
| 4,477,833 | 10/1984 | Clark et al. | 358/80 |
| 4,481,532 | 11/1984 | Clark et al. | 358/80 |
| 4,482,923 | 11/1984 | Fischer et al. | 358/283 |
| 4,630,125 | 12/1986 | Roetling | 358/458 |
| 4,668,995 | 5/1987 | Chen et al. | 358/282 |
| 4,709,395 | 11/1987 | Fischer et al. | 382/54 |
| 4,876,611 | 10/1989 | Fischer et al. | 358/456 |
| 4,907,096 | 3/1990 | Stansfield et al. | 358/456 |
| 4,924,322 | 5/1990 | Kurosawa et al. | 358/448 |
| 5,051,844 | 9/1991 | Sullivan | 358/456 |
| 5,107,346 | 4/1992 | Bowers et al. | 358/447 |

OTHER PUBLICATIONS

Mannos and Sakrison, "The Effects of Visual Fidelity Criterion on the Incoding of Images", *IEEE Transactions on Information Theory*, Jul. 19, 1974.

Goertzel, Mintzer, Thompson and Chin, entitled "The Design of Interpolation Filters and Their Application to Image Scaling and Rotation", *Pattern Recognition-/Image Processing ITL, Tokyo conference*, Apr. 16, 1986.

J. Sullivan, et al., "New Algorithm for Image Halftoning Using a Human Visual Model", *Advanced Printing of Conference Summaries*, May 20-25, 1990, pp. 145-148.

R. F. Quick, "System Theory and Vision: A Review of Models and Applications", *Proceedings of the SID*, vol. 21/3, 1980, pp. 209-217.

R. A. Ulichney, "Dithering with Blue Noise", *Proc. of the IEEE*, vol. 76, No. 1, Jan. 1988, pp. 56-79.

J. A. G. Hale, "Dot Spacing Modulation for the Production of Pseudo Grey Pictures", *Proc. of the SID.*, vol. 17/2 Sec. Qrtr. 1976, pp. 63-74.

R. W. Floyd, et al., "An Adaptive Algorithm for Spatial Greyscale", *Proceeding of the SID*, vol. 17/2 Sec. Qrtr. 1976, pp. 75-77.

L. E. Lawson, "Exposing and Processing Screenless Printing Plates", 1978 *Proc. of the Technical Assoc. of the Graphic Arts*, pp. 45-49.

J. L. Silver, et al., "Comparison of Random Dot and Conventional . . . ", 1981*Proc. of the Technical Assoc. of the Graphic Arts*, pp. 174-203.

(List continued on next page.)

*Primary Examiner*—Edward L. Coles, Sr.
*Assistant Examiner*—Scott A. Rogers
*Attorney, Agent, or Firm*—Marshall, O'Toole, Gerstein, Murray & Borun

[57] ABSTRACT

A system is disclosed for converting a continuous tone value to an output value having a first level or a second level. A first error magnitude is generated based upon continuous tone values already converted, continuous tone values not yet converted and an output value having the first level assumed for the continuous tone value undergoing conversion. A second error magnitude is similarly generated except that an output value having the second level is assumed for the continuous tone value undergoing conversion. If the first error magnitude is less than the second error magnitude, then the continuous tone value undergoing conversion is converted to the output value having the first level and, otherwise, the continuous tone value undergoing conversion is converted to the output value having the second level. The error corresponding to the converted lineary value is diffused in a predetermined manner to neighboring continuous tone values which have not yet been converted.

60 Claims, 11 Drawing Sheets

OTHER PUBLICATIONS

D. Anastassiou, et al., "Digital Halftoning of Images", *IBM J. Res. Develop.* vol. 26, No. 6, Nov. 82, pp. 687–697.

Billotet-Hoffmann, et al., "Optical Pseudocolor Encoding using Adaptive . . . ", *Optics Communication*, vol. 45, No. 5, May 1, 1983, pp. 327–330.

S. H. Algie, "Resolution and Tonal Continuity in Bilevel Printed Picture Quality", *Computer Vision, Graphics, and Image Processing*, 24, 329–346 (1983).

P. Carnevali, et al., "Image Processing by Simulated Annealing", *IBM J. Res. Develop.*, vol. 29, No. 6, Nov. 1985, pp. 569–578.

R. Eschbach, et al., "A 2-D Pulse Density Modulation by Iteration . . . " *Optics Communication*, vol. 62, No. 5, Jun. 1, 1987, pp. 300–304.

Anastassiou, et al., "Progressive Half-Toning of Images", *Electronics Letters*, vol. 24 No. 8, Apr. 14th 1988.

Anastassiou, et al., "Digital Image Halftoning Using Neural Networks", *Visual Comm. and Image Processing*, SPIE, vol. 1001, 1988, pp. 1062–1066.

Bernard, et al., "Design of a Half Toning Integrated Circuit Based on Analog . . . " 1988 *IEEE Symposium on Circuits and Systems*, Espoo, Finland, Jun. 7–9, 1988, pp. 1217–1220.

M. Broja, et al., "Digital Halftoning by Interative Procedure", *Optics Communications*, vol. 69, No. 3,4, Jan. 1 1989, pp. 205–210.

R. Eschbech, "Pulse-Density Modulation on Rastered Media: Combining . . . ", *J. Opt. Soc. Am. A*, vol. 7, No. 4/Apr. 1990, pp. 708–716.

R. Gentile, et al., "Quantization and Multilevel Haltoning of Color Images . . . ", *J. Opt. Soc. Am.A*, vol. 7, No.6/Jun. 1990, pp. 1019–1026.

M. Broja, et al., "Error Diffusion Concept for Multi-Level Quantization", *Optics Communications*, vol. 79, No. 5, Nov. 1 1990, pp. 280–284.

J. Kim, et al., "Design of Optimal Filters for Error-Feedback Quantization of . . . ", *Information Sciences*, 39, 285–298 (1986).

J. F. Jarvis, et al., "A Survey of Techniques for the Display of Continuous . . . ", *Computer, Graphics, and Image Processing*, 5, 13–40 (1976).

S. Kollias, et al., "A Unified Neural Network Approach to Digital Image Halftoning", *IEEE Trans. on Signal Processing*, vol. 39, No. 4, Apr. 1991, pp. 980–984.

FIG. 3
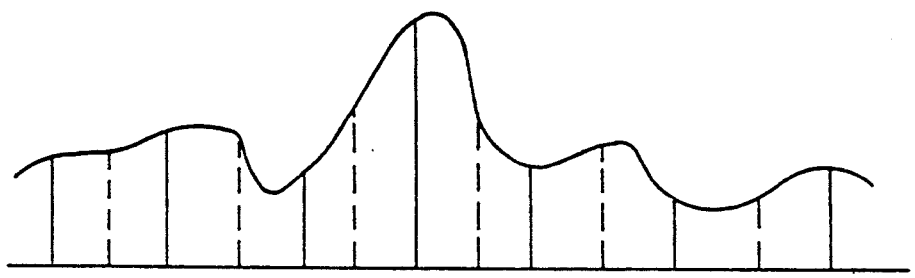
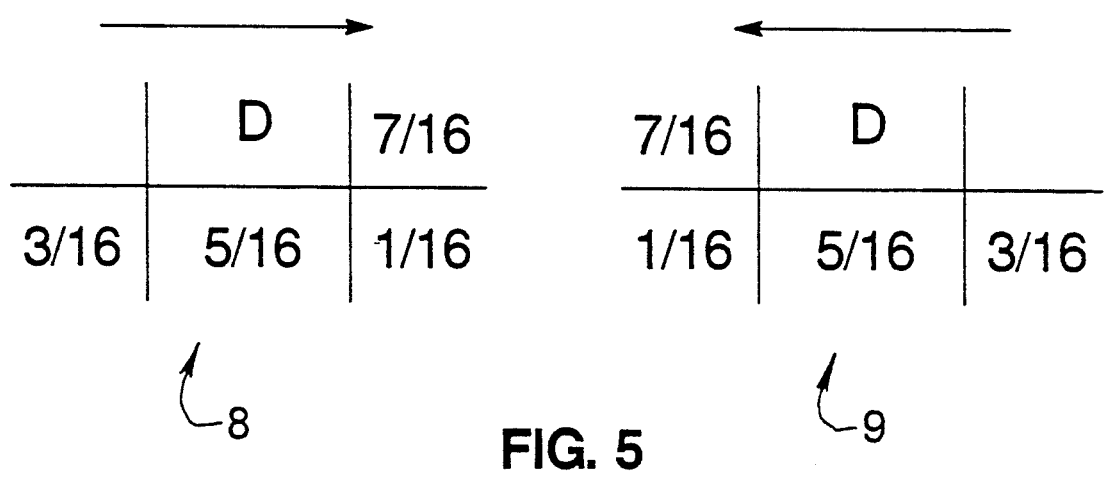
FIG. 5

FIG. 4

$$\begin{array}{ccccccc}
c_{1,1} & c_{1,2} & c_{1,3} & c_{1,4} & c_{1,5} & c_{1,6} & c_{1,7} \\
c_{2,1} & c_{2,2} & c_{2,3} & c_{2,4} & c_{2,5} & c_{2,6} & c_{2,7} \\
c_{3,1} & c_{3,2} & c_{3,3} & c_{3,4} & c_{3,5} & c_{3,6} & c_{3,7} \\
c_{4,1} & c_{4,2} & c_{4,3} & c_{4,4} & c_{4,5} & c_{4,6} & c_{4,7} \\
c_{5,1} & c_{5,2} & c_{5,3} & c_{5,4} & c_{5,5} & c_{5,6} & c_{5,7} \\
c_{6,1} & c_{6,2} & c_{6,3} & c_{6,4} & c_{6,5} & c_{6,6} & c_{6,7} \\
c_{7,1} & c_{7,2} & c_{7,3} & c_{7,4} & c_{7,5} & c_{7,6} & c_{7,7}
\end{array}$$

18 — 18a, 18b $$\begin{array}{ccccccc}
b_{1,1} & b_{1,2} & b_{1,3} & b_{1,4} & b_{1,5} & b_{1,6} & b_{1,7} \\
b_{2,1} & b_{2,2} & b_{2,3} & b_{2,4} & b_{2,5} & b_{2,6} & b_{2,7} \\
b_{3,1} & b_{3,2} & b_{3,3} & b_{3,4} & b_{3,5} & b_{3,6} & b_{3,7} \\
b_{4,1} & b_{4,2} & b_{4,3} & b_{4,4} & b_{4,5} & b_{4,6} & b_{4,7} \\
b_{5,1} & b_{5,2} & b_{5,3} & b_{5,4} & b_{5,5} & b_{5,6} & b_{5,7} \\
b_{6,1} & b_{6,2} & b_{6,3} & b_{6,4} & b_{6,5} & b_{6,6} & b_{6,7} \\
b_{7,1} & b_{7,2} & b_{7,3} & b_{7,4} & b_{7,5} & b_{7,6} & b_{7,7}
\end{array}$$

19 — 19a, 19b $$\begin{array}{ccccccc}
w_{1,1} & w_{1,2} & w_{1,3} & w_{1,4} & w_{1,5} & w_{1,6} & w_{1,7} \\
w_{2,1} & w_{2,2} & w_{2,3} & w_{2,4} & w_{2,5} & w_{2,6} & w_{2,7} \\
w_{3,1} & w_{3,2} & w_{3,3} & w_{3,4} & w_{3,5} & w_{3,6} & w_{3,7} \\
w_{4,1} & w_{4,2} & w_{4,3} & w_{4,4} & w_{4,5} & w_{4,6} & w_{4,7} \\
w_{5,1} & w_{5,2} & w_{5,3} & w_{5,4} & w_{5,5} & w_{5,6} & w_{5,7} \\
w_{6,1} & w_{6,2} & w_{6,3} & w_{6,4} & w_{6,5} & w_{6,6} & w_{6,7} \\
w_{7,1} & w_{7,2} & w_{7,3} & w_{7,4} & w_{7,5} & w_{7,6} & w_{7,7}
\end{array}$$

20 — 20a, 20b

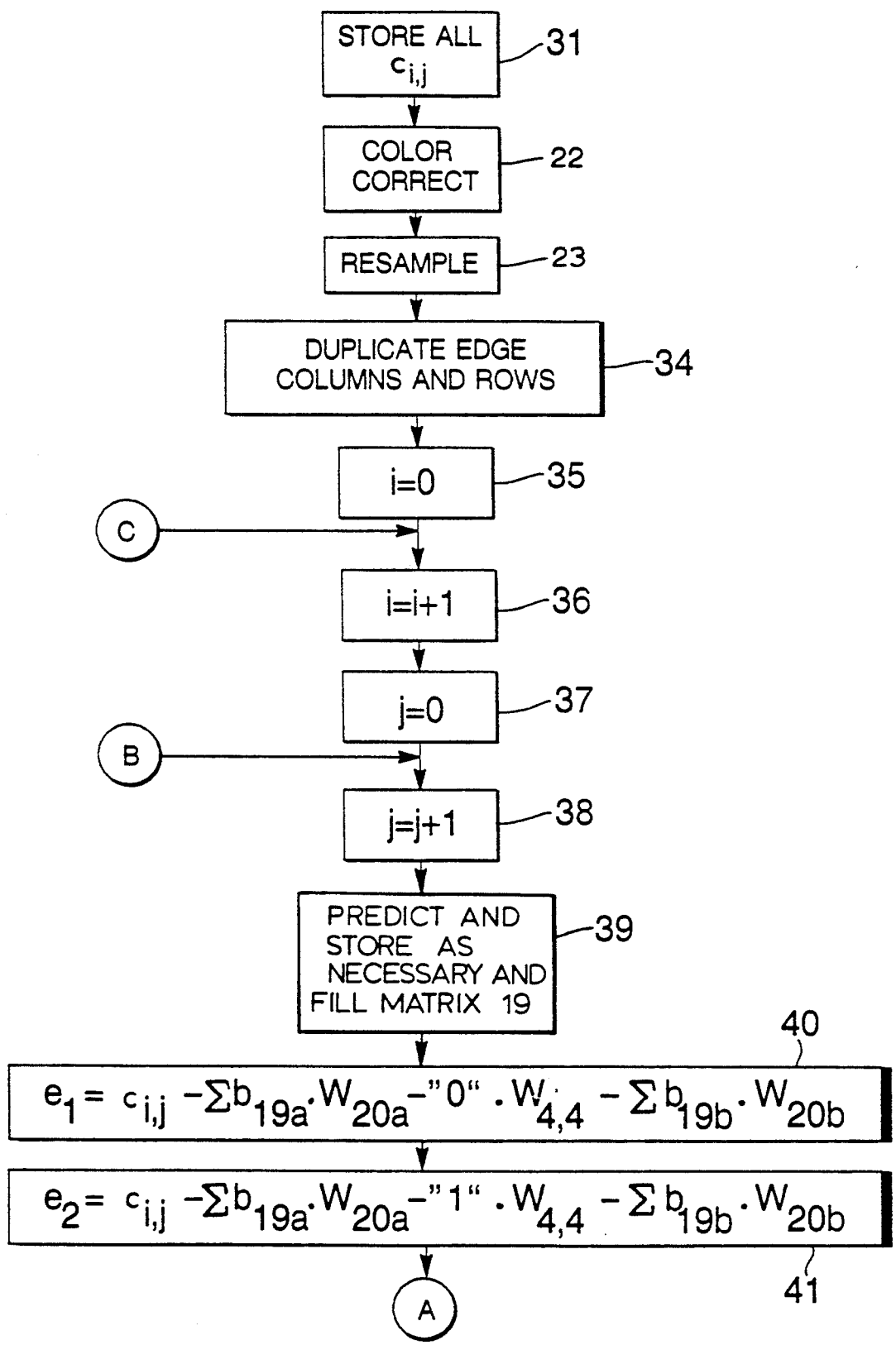

FIG. 7

| | | | | | | |
|---|---|---|---|---|---|---|
| −0.0015 | −0.0013 | 0.0000 | 0.0012 | 0.0000 | −0.0013 | −0.0015 |
| −0.0013 | 0.0015 | 0.0105 | 0.0173 | 0.0105 | 0.0015 | −0.0013 |
| 0.0000 | 0.0105 | 0.0580 | 0.1049 | 0.0580 | 0.0105 | 0.0000 |
| 0.0012 | 0.0173 | 0.1050 | 0.1999 | 0.1050 | 0.0173 | 0.0012 |
| 0.0000 | 0.0105 | 0.0580 | 0.1049 | 0.0580 | 0.0105 | 0.0000 |
| −0.0013 | 0.0015 | 0.0105 | 0.0173 | 0.0105 | 0.0015 | −0.0013 |
| −0.0015 | −0.0013 | 0.0000 | 0.0012 | 0.0000 | −0.0013 | −0.0015 |

|   | A | B | C | D | E | F | G | H | I | J |
|---|---|---|---|---|---|---|---|---|---|---|
| 1 | 1 |   | 0 |   | 1 |   | 1 |   | 0 |   |
| 2 |   |   |   |   |   |   |   |   |   |   |
| 3 | 0 |   | 1 |   | 1 |   | 0 |   | 1 |   |
| 4 |   |   |   |   |   |   |   |   |   |   |
| 5 | 1 |   | 1 |   | 1 |   | 0 |   | 0 |   |
| 6 |   |   |   |   |   |   |   |   |   |   |
| 7 | 1 |   | 0 |   | 0 |   | 0 |   | 1 |   |
| 8 |   |   |   |   |   |   |   |   |   |   |
| 9 | 0 |   | 0 |   | 0 |   | 0 |   | 1 |   |
| 10|   |   |   |   |   |   |   |   |   |   |

FIG. 10

|    | A | B | C | D | E | F | G | H | I | J |
|----|---|---|---|---|---|---|---|---|---|---|
| 1  | 1 | 1 | 0 | 0 | 1 | 1 | 1 | 1 | 0 | 0 |
| 2  | 1 | 1 | 0 | 0 | 1 | 1 | 1 | 1 | 0 | 0 |
| 3  | 0 | 0 | 1 | 1 | 1 | 1 | 0 | 0 | 1 | 1 |
| 4  | 0 | 0 | 1 | 1 | 1 | 1 | 0 | 0 | 1 | 1 |
| 5  | 1 | 1 | 1 | 1 | 1 | 1 | 0 | 0 | 0 | 0 |
| 6  | 1 | 1 | 1 | 1 | 1 | 1 | 0 | 0 | 0 | 0 |
| 7  | 1 | 1 | 0 | 0 | 0 | 0 | 0 | 0 | 1 | 1 |
| 8  | 1 | 1 | 0 | 0 | 0 | 0 | 0 | 0 | 1 | 1 |
| 9  | 0 | 0 | 0 | 0 | 0 | 0 | 0 | 0 | 1 | 1 |
| 10 | 0 | 0 | 0 | 0 | 0 | 0 | 0 | 0 | 1 | 1 |

ELECTRONIC HIGH-FIDELITY SCREENLESS CONVERSION SYSTEM

FIELD OF THE INVENTION

The present invention relates to the conversion of input values into output values and, more particularly, to the conversion of continuous tone values into output values representing dots which can be used in the reproduction of an original.

BACKGROUND OF THE INVENTION

In lithographic printing systems, an original to be reproduced is scanned by a scanner on a pixel-by-pixel basis and the resulting scanned values are used to create one or more printing plates. When a monochrome (e.g., black and white) reproduction is to be printed, a single printing plate is produced. On the other hand, when a color reproduction is to be printed, a set of four plates are produced, one for each of the subtractive primary colors of magenta, cyan and yellow and one for black. The colored inks reproduce the hues of the original and the black ink produces a desired neutral density that cannot be attained by colored inks alone. In addition, since black ink is less expensive than colored inks, grey replacement (a form of undercolor removal) may be effected to replace quantities of the colored inks with black ink. Such a process reduces the cost to produce the reproduction without significantly affecting the appearance thereof.

In traditional prior art lithographic half-tone reproduction systems, each printing plate includes a number of contiguous cells of equal size wherein each cell contains zero, one or more elementary marks (or "microdots") clustered together to form a single large "dot" in the cell. More recently, systems have been devised wherein mircodots have been dispersed in a regular pattern in each cell and, in other systems, microdots have been dispersed in a random pattern on a medium. In each event, the number of elementary marks used to create a cluster dot or a dispersed dot depends upon the amount of ink to be applied to the substrate at the cell location. This is, in turn, dependent upon the scanned value of the original at a corresponding location thereof.

In the past, dots were formed within these cells on a regular spacing or grid using a screen in a photochemical etching process. More recently, half-tone reproduction systems have utilized data processing equipment that electronically produces data representing a half-tone image. This data can be used to plot film or to directly form a printing plate without the use of an actual screen. However, the terms "screen" and "screening" are still used to define the dot pattern produced in a half-tone reproduction. For example, the term "screen ruling" specifies the distance between centers of adjacent cells of the plate. When the cells are all of the same size and regularly spaced, the plate is said to have a "regular screening". In such a case, a cell contains one period of the "screen".

Systems that reproduce half-tone images with regular screening have several drawbacks. For example, resolution is limited by screen ruling. Screen ruling is limited, in turn, by the minimum dot size and spacing that can be reliably and consistently printed. Moreover, regular dot patterns produced by regular screening in color reproduction result in moiré effects and color shifts caused by interference between the superimposed dot patterns. Such undesirable artifacts have been reduced in the past by superimposing the screens at angles with respect to one another. However, this technique is not entirely satisfactory since undesired effects are only minimized, not eliminated completely.

The prior art has reduced the effects of moiré and color shifts while at the same time enhancing the quality of the reproduction by eliminating the use of regular screens. Instead, a process known as "screenless" lithography (also referred to as random screening or random dot lithography) has been used to produce irregular dot patterns on the printed page. The use of irregular dot patterns can eliminate visual interference caused by superimposition of the dot patterns, and hence moiré effects are substantially reduced or eliminated.

In one prior art system, a printing plate having an irregular grain structure is photographically exposed and chemically developed in a photolithographic process to produce an irregular dot structure. Such systems cannot created consistent dot patterns from plate to plate, however.

Random screening has been electronically achieved utilizing an error diffusion technique, such as that described by Floyd and Steinberg in their paper "An Adaptive Algorithm for Spatial Greyscale", *Proceeding of the S.I.D.*, Vol. 17/2, Second Quarter, 1976. This paper discloses a reproduction system that compares each continuous tone value, obtained by scanning an original, with a threshold to obtain a binary approximation of the continuous tone value. When the continuous tone value is less than the threshold, the continuous tone value is converted to a binary value of zero. If the continuous tone value is greater than the threshold, the continuous tone value is converted to a binary value of one. After conversion, the error resulting from approximation of the continuous tone value is subdivided into error portions and the error portions are summed in a prescribed pattern with neighboring continuous tone values yet to be converted so that such error is diffused. Each continuous tone value to be converted is thus a combination of its original continuous tone value plus any error portions diffused to it by the conversion of neighboring, previously converted continuous tone values. The next continuous tone value to be converted is then compared to the threshold and converted to one of the binary values. The resulting error, if any, is diffused to neighboring continuous tone values yet to be converted. This process is repeated until all continuous tone values resulting from scanning of the original have been converted to binary values. The binary values thus derived are used to produce a printing plate having dots at locations defined by such values.

While the foregoing process is effective to reproduce half-tone images with random dots, it has been found that the dots create artifacts in the reproduction. These artifacts detract from the visual appearance of the reproduction.

Sullivan, U.S. Pat. No. 5,051,844, discloses an error diffusion conversion system wherein a filter simulating the human visual system is utilized to reduce the incidence of artifacts in the reproduction. In this system, the filter comprises an array of filter elements or numbers, one of which is multiplied with an assumed binary value of zero for the continuous tone value undergoing conversion and the remaining of which are multiplied with binary values representing continuous tone values that have already been converted. The resulting values are subtracted from the continuous tone value undergoing conversion to produce a first error. A second error is produced in the same fashion, except that the one filter element is multiplied with an assumed binary value of one for the continuous tone value undergoing conversion. If the magnitude of the first error is less than the magnitude of the second error, the continuous tone value undergoing conversion is converted to a binary value of zero. Otherwise, the value is converted to a binary value of one. The error resulting from conversion of the continuous tone value is then diffused in a predetermined manner to neighboring continuous tone values that have not yet been converted.

The Sullivan system, therefore, simulates a retrospective spatial view of converted continuous tone values using a filter approximating the human eye in order to reduce perceived errors which would otherwise result.

SUMMARY OF THE INVENTION

The present invention further reduces perception errors by taking a prospective spatial view, as well as a retrospective spatial view, in the conversion of each continuous tone value to a corresponding output value which may be a half-tone (binary) value.

Accordingly, the invention relates to a system for converting a continuous tone value undergoing conversion to either an output value having a first level or an output value having a second level based upon a previously converted continuous tone value and a continuous tone value yet to be converted. A first error is generated based upon the previously converted continuous tone value, the continuous tone value yet to be converted, and an output value having an assumed first level for the continuous tone value undergoing conversion. A second error is generated based upon the previously converted continuous tone value, the continuous tone value yet to be converted, and an output value having an assumed second level for the continuous tone value undergoing conversion. If the magnitude of the first error is less than the magnitude of the second error, then the continuous tone value undergoing conversion is converted to the output value having the first level, and if the magnitude of the first error is greater than the magnitude of the second error, then the continuous tone value undergoing conversion is converted to the output value having the second level.

In one aspect of the invention, the error corresponding to the converted output value is diffused in a predetermined manner to neighboring continuous tone values which have not yet been converted.

In another aspect of the invention, the output value corresponding to the previously converted continuous tone value and the output value predicted from the continuous tone value yet to be converted, as well as the two output values having the first and second levels, may advantageously be applied to a filter representing a model of the human eye.

Furthermore, error diffusion can be used to derive the predicted output value. In order to still further reduce perception errors, such diffusion can utilize random thresholding and, if more than one predicted output value are used, serpentine rastering can be employed.

If the number of continuous tone values resulting from scanning is insufficient to reproduce the original with adequate resolution, digital resampling (which may include interpolation) may be used for increasing the number of continuous tone values.

Error diffusion type screenless conversion techniques for converting continuous tone values into output values are particularly useful in combination with film plotters to plot the resulting half-tone dots onto films for later forming of printing plates which can be used in reproduction of the original. The output values which result from the screenless conversion of continuous tone values can be conveniently stored in memory until the film is to be plotted by the film plotter.

Alternatively, the output values which result from the screenless conversion of continuous tone values can be conveniently used directly to form printing plates without the need of first plotting a film for later exposure of a plate.

BRIEF DESCRIPTION OF THE DRAWINGS

These and other features and advantages will become more apparent from a detailed consideration of the invention when taken in conjunction with the drawings in which:

FIG. 3 is a graph useful in explaining the digital resampling shown in FIG. 2;

FIG. 4 is a chart useful in explaining screenless conversion according to the present invention;

FIG. 5 shows one manner of error diffusion useful in conjunction with the present invention;

FIGS. 6A and 6B, when joined at the similarly lettered line 3, together, comprise a flowchart illustrating programing executed by the processor of FIGS. 1A and 1B;

FIG. 7 shows examples of filter values which may be used in conjunction with the present invention;

FIG. 8 shows how the rows and columns of the continuous tone values may be duplicated in order to convert continuous tone values generated at or near the edges of the original;

FIG. 9 shows an example of converted values before duplication;

FIG. 10 shows the values of FIG. 9 after duplication;

DETAILED DESCRIPTION

Figure 1A:
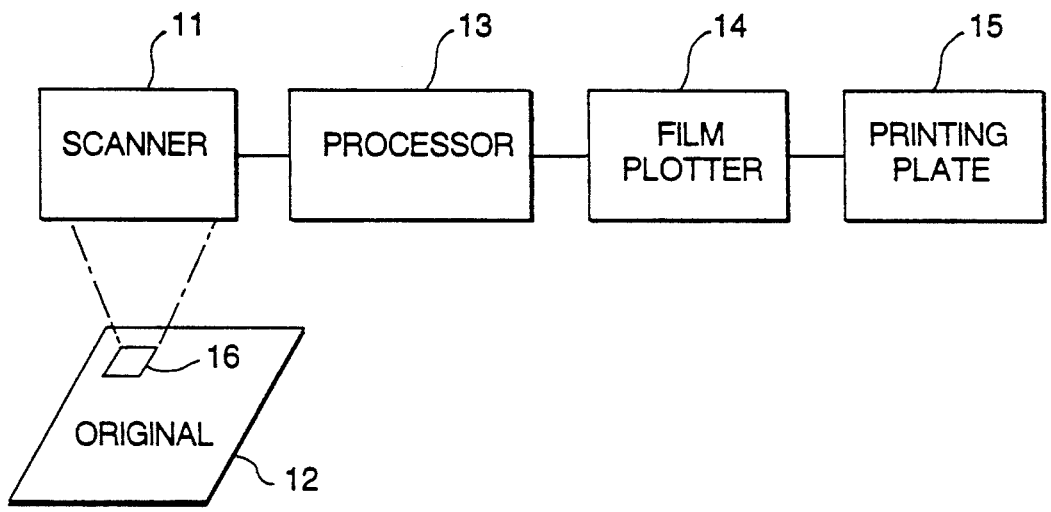
FIGS. 1A and 1B are block diagrams illustrating two environments in which the present invention can be used.

As shown in FIG. 1A, the present invention is particularly useful in an image reproduction system 10. Reproduction system 10 includes a scanner 11 which scans or samples each pixel, such as pixel 16, of an original 12. Original 12 may consist of a pictorial image and line work (line work may include textual material). Each pixel of original 12 is converted by scanner 11 into an eight bit digitized continuous tone value which is supplied to, and stored in, a memory (not shown) of a processor 13. (This eight bit digitized continuous tone value may also be referred to as an input value.) Since eight bits are used, each continuous tone value has an amplitude resolution of 256 different levels. Processor 13 converts the continuous tone values to output values which, because they have only two levels, are referred to as half-tone binary values. These half-tone binary values are stored in the memory and are then used by a film plotter 14 to plot a film which in turn is used by a block 15 to create a printing plate.

Figure 1B:
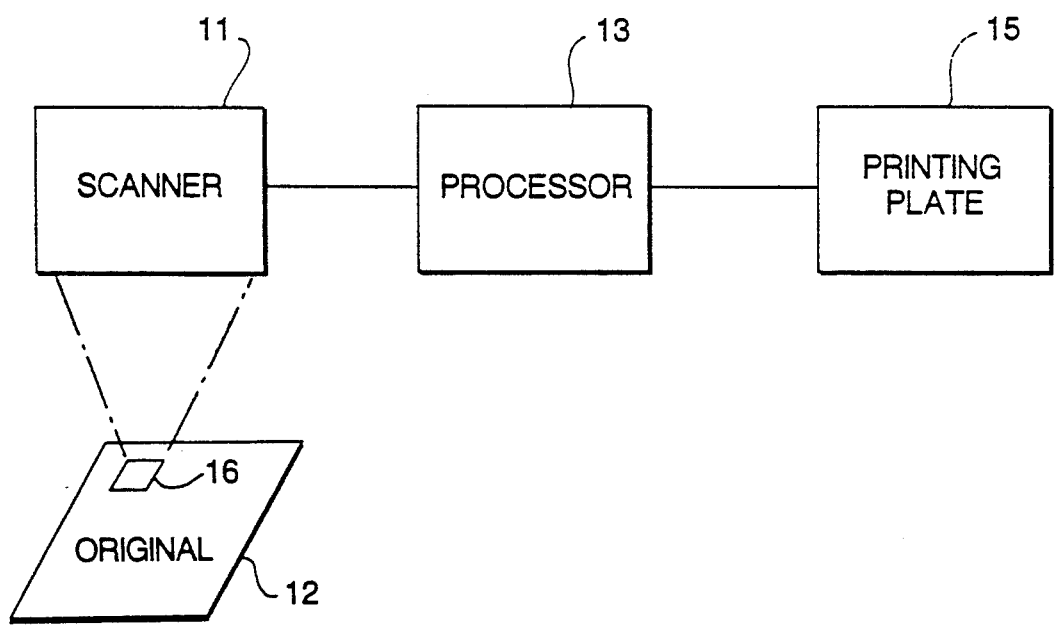

Alternatively, as shown in FIG. 1B, the half-tone binary values can be used directly in the formation of printing plates without the necessity of first creating a film from the half-tone binary values and then using the film to form the plates.

The printing plate, whether created directly or by film, can then be used in a printer, such as an offset printer, for reproducing original 12.

For ease in understanding the present invention, it is useful to envision the continuous tone values and the half-tone binary values as forming first and second arrays in the processor memory, although the data need not be physically stored as such. The location of each half-tone binary value in the second array is used to determine the location of a potential elementary plotter mark and the specific value of the half-tone binary value determines whether or not a dot is printed on the film or formed directly on the plate at that location. The array of binary half-tone values as a whole defines a pattern of elementary plotter marks to be plotted on the film or directly on the plate and this pattern will result in reproduction of the original when printed.

If original 12 is to be reproduced using only one ink, e.g. black, processor 13 stores and supplies only one set of binary values. The number of elementary plotter marks in a given area controls the amount of grayness in that area of the reproduced image and the pattern of elementary plotter marks represents the image and line work of the original. In the event the system is used for color reproduction, the scanner 11 uses color filters to produce three arrays or sets of continuous tone values, one for each of the three primary additive colors red, green and blue. If the three arrays representing the three primary additive colors have not already been translated to four arrays representing the four printing colors of cyan, magenta, yellow and black, processor 13 will do so. Processor 13 converts each array of continuous tone values to a corresponding array of half-tone binary values. Film plotter 14 then uses each array to plot a separate film for each of the printing colors or each array is used directly to form a separate printing plate for each of the printing colors. During printing, as is well known, each printing plate separately lays down its associated color on the paper or substrate on which the original is being reproduced. The colors are combined by the human visual system to reproduce the colors of the original 12.

Figure 2:
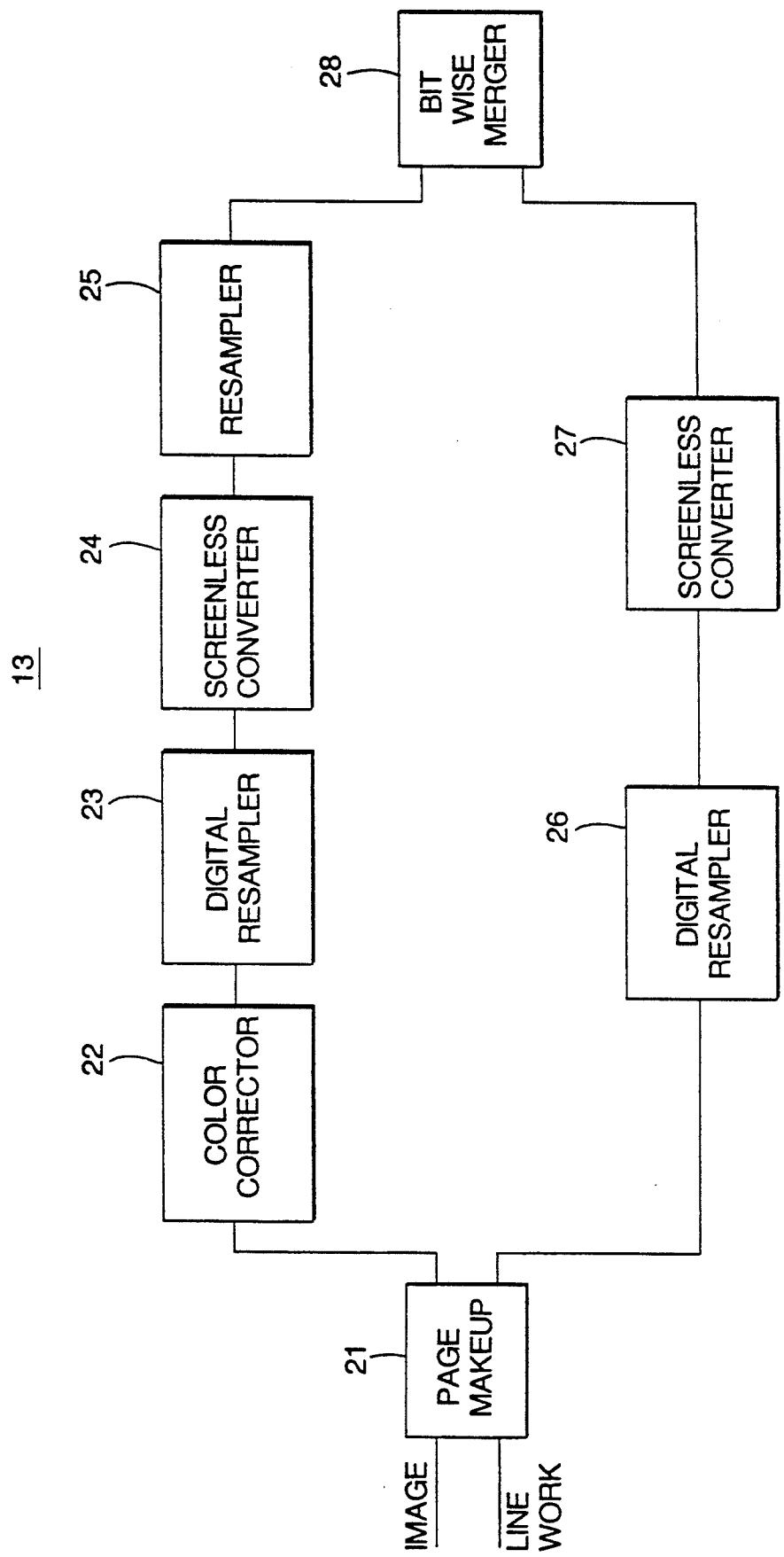
FIG. 2 is a generalized block diagram showing the functions undertaken by the processor of FIGS. 1A and 1B.

The processor 13, which may be in the form of a general purpose computer, performs a number of functions as shown in FIG. 2. The image and line work, represented by signals from scanner 11, can be combined at block 21 in order to make up a page as it will appear at reproduction. At this point, the image and line work can be arranged and rearranged by an operator until the page has the desired appearance. From page makeup block 21, the continuous tone values representing the image are processed along the upper path of FIG. 2 while the line work is processed along the lower path.

Along the upper path, the image data is supplied to color corrector 22 where the color is corrected for printing. This color correction, such as that shown in Clark et al., U.S. Pat. Nos. 4,477,833 and 4,481,532, the disclosures of which are incorporated by reference herein, accounts for the different qualities of ink, paper and marking devices (e.g. a film plotter 14), thus providing the capability to substantially match the reproduction to the original. If necessary, the continuous tone values are then digitally resampled by block 23 after color correction in order to increase the number of such values per inch. This increase is desirable to increase the resolution of the reproduction and may be necessary to match the possibly higher resolution of the marking device. For example, the resolution of the continuous tone values exiting color corrector 23 may be at 300 dots (elementary plotter marks) per inch whereas the continuous tone values exiting digital resampler 23 may have a resolution of approximately 750 dots per inch.

Digital resampler 23 includes an interpolator for interpolating between the input continuous tone values supplied to it. As shown in FIG. 3, the solid vertical lines represent the input continuous tone values and the dashed lines represent the interpolated continuous tone values between the input continuous tone values. After resampling, the continuous tone values to be converted to half-tone values comprise the interpolated continuous tone values. Although any form of interpolation, such as a straight line interpolation, can be used between adjacent input values, it is preferable to use the interpolation filter disclosed by Goertzel, Mintzer, Thompson and Chin in their Pattern Recognition/Image Processing ITL, Tokyo, conference article of Apr. 16, 1986 entitled "The Design of Interpolation Filters and their Application to Image Scaling and Rotation", the disclosure of which is hereby incorporated by reference herein. The filter disclosed in this article can be used to scale the image, by either enlarging the number of sampled data or reducing the number of sampled data, and to rotate the image represented by the sampled data. In connection with the present invention, the filter is used only to enlarge the number of continuous tone values. The filter increases the number of continuous tone values in each row (which has the effect of increasing the number of columns of continuous tone values) and then increases the number of continuous tone values in each column (which has the effect of increasing the number of rows of continuous tone values).

The continuous tone values, which have been increased in number by digital resampler 23, are then supplied to screenless converter 24 which converts these continuous tone values into corresponding half-tone binary values. The screenless conversion process is shown in more detail in connection with FIGS. 4, 5 and 6. FIG. 4 shows a matrix 18 of continuous tone values. Matrix 18 is preferably, although not necessarily, a 7×7 matrix. The actual number of continuous tone values stored in the memory of the processor 13 is greatly in excess of the number shown in matrix 18. The continuous tone values selected to be in matrix 18 are those continuous tone values which are in visual proximity to the continuous tone value in location $c_{4,4}$, i.e. the continuous tone value undergoing conversion. Thus, this matrix 18 contains a neighborhood of those continuous tone values in visual proximity to the continuous tone value undergoing conversion.

A matrix 19 is created by placing certain binary values into a temporary buffer. Portion 19a of matrix 19 contains binary values corresponding to continuous tone values in portion 18a of matrix 18. That is, the binary value in location $b_{1,1}$ corresponds to the continuous tone value in location $c_{1,1}$, the binary value in location $b_{1,2}$ corresponds to the continuous tone value in location $c_{1,2}$, and so on.

A filter 20 includes filter values arranged in a matrix which is the same size as the matrices 18 and 19. The filter 20 includes suitable filter values or elements, such as the values shown in FIG. 7 by way of example only. These values can be derived according to the method disclosed by Mannos and Sakrison in their article "The Effects of Visual Fidelity Criterion on the Incoding of Images" appearing in the Jul. 19, 1974 issue of IEEE Transactions on Information Theory, the disclosure of which is hereby incorporated by reference herein. The filter 20 has a retrospective spatial section 20a which is applied to a corresponding number of binary values in the portion 19a, a filter value $w_{4,4}$ which is applied to assumed binary values of "0" and "1" for the corresponding continuous tone value undergoing conversion, and a prospective spatial section 20b which is applied to a corresponding number of binary values in the portion 19b, i.e. those binary values corresponding to the continuous tone values in the portion 18b.

The conversion process starts with the first stored continuous tone value obtained by scanning the pixel in the uppermost, left-hand position of the original. Conversion then proceeds to the right along the topmost row of pixels until the continuous tone value obtained by scanning the uppermost, right-hand pixel to the original is converted. The conversion process then returns to the continuous tone value obtained by scanning the left-most pixel in the second row of pixels from the top of the original and proceeds to the right to the end of that row and so on.

FIG. 8 illustrates a duplication process that is undertaken to provide enough continuous tone values so that conversion can be effected for continuous tone values at or near the margins of the original. That is, let it be assumed that the dashed line box 60 in FIG. 8 contains all of the stored continuous tone values of the original arranged in an array. (Of course, in actual practice, there would be many more continuous tone values and they would not necessarily be stored in array form. Also, although the same subscripts have been used in FIGS. 4 and 8, subscripts refer to matrix or array locations in each Figure and do not refer to actual values so that the values in locations $c_{1,1}$ of FIGS. 4 and 8 are not necessarily the same.) Since each continuous tone value must have 48 continuous tone values surrounding it arranged in three rows above and below and in three columns to the left and right, additional continuous tone values in the top three rows from $c_{-2,-2}$ to $c_{0,10}$, in the bottom three rows from $c_{-8,-2}$ to $c_{10,10}$, in the first three columns from $c_{1,-2}$ to $c_{7,0}$, and in the last three columns from $c_{1,8}$ to $c_{7,10}$ must be generated. This is accomplished by duplicating the outermost rows and columns. Specifically, the continuous tone value in location $c_{1,1}$ is duplicated into locations $c_{0,1}$, $c_{-1,1}$ and $c_{-2,1}$, the continuous tone value in location $c_{1,2}$ is duplicated into locations $c_{0,2}$, $c_{-1,2}$ and $c_{-2,2}$, and so on through the continuous tone value in location $c_{1,7}$. Similarly, the seventh row is duplicated into the eighth, ninth and tenth rows so that the continuous tone value in location $c_{7,1}$ is duplicated into locations $c_{8,1}$, $c_{9,1}$ and $c_{10,1}$, the continuous tone value in location $c_{7,2}$ is duplicated into locations $c_{8,2}$, $c_{9,2}$ and $c_{10,2}$, and so on through the continuous tone value in location $c_{7,7}$. Also, the first column is duplicated into columns 0, $-1$ and $-2$ so that the continuous tone value in location $c_{-2,1}$ is duplicated into locations $c_{-2,0}$, $c_{-2,-1}$, and $c_{-2,-2}$, the continuous tone value in location $c_{-1,1}$ is duplicated into locations $c_{-1,0}$, $c_{-1,-1}$, and $c_{-1,-2}$ and so on. In like fashion, the seventh column is duplicated into the eight, ninth and tenth columns.

At this point, there are no binary values in the matrix 19 to which filter 20 can be applied to calculate a binary value corresponding to the first continuous tone value to be converted. In order to provide binary values, error diffusion is applied to the first seven rows of FIG. 8 (i.e. rows $-2$, $-1$, 0, 1, 2, 3, and 4) to create an array of binary values $b_{-2,-2}$–$b_{4,10}$ (this array is not shown in the Figures but has a structure identical to the array portion comprising elements $c_{-2,-5}$–$c_{4,10}$ of FIG. 8) which comprise predicted binary values for the corresponding continuous tone values in those first seven rows.

This prediction process begins by comparing the continuous tone value at location $c_{-2,-2}$ to a threshold. If this continuous tone value is greater than the threshold, the corresponding binary value in location $b_{-2,-2}$ is set to a binary value of "1". If the continuous tone value in location $c_{-2,-2}$ is below the threshold, the corresponding binary value in location $b_{-2,-2}$ is set to a binary value of "0". Then the difference D between the continuous tone value in location $c_{-2,-2}$ and its corresponding predicted binary value in location $b_{-2,-2}$ is calculated and diffused according to diffusion pattern 8 shown in FIG. 5. Specifically, if the corresponding binary value in the location $b_{-2,-2}$ has been set to "1", the continuous tone value in the location $c_{4,5}$ is subtracted from 255 to calculate the difference D. If the corresponding binary value in the location $b_{4,5}$ has been set to "0", the difference D is set equal to the continuous tone value in the location $c_{-2,-2}$. Thereafter, 7/16ths of this difference is added to the continuous tone value in location $c_{-2,-1}$, 1/16ths of the difference is added to the continuous tone value in location $c_{-1,-1}$ and 5/16ths of the difference D is added to the continuous tone value in location $c_{-1,-2}$. In this case, a remaining difference portion comprising 3/16 of the difference D is not summed with a continuous tone value since there is no continuous tone value below and to the left of location $c_{-2,-2}$. A binary value is similarly predicted for the next continuous tone value in location $c_{-2,-1}$. That is, the original continuous tone value together with any difference diffused to it from the prediction of its neighboring continuous tone value ahead of it in position $c_{-2,-2}$ is compared to the threshold and, based upon such comparison is converted to one of the binary values. The difference D is then calculated and all of portions of the difference are diffused to neighboring continuous tone values in accordance with the diffusion pattern 8. In this case, all of the difference portions are diffused since there are values in all of the locations defined by the pattern 8. The remaining values of this row are thereafter converted to predicted values in the same manner.

Once the first row has been predicted, prediction proceeds in the second row from right to left, i.e. from the value $c_{-1,10}$ to the value $c_{-1,-2}$. During such prediction, each resulting difference D is diffused in accordance with the pattern 9 of FIG. 5. Prediction is otherwise identical to that described above.

Prediction in subsequent rows proceeds in alternating left-to-right and right-to-left fashion using the diffusion patterns 8 and 9, respectively, alternatingly until the seventh row is converted. When prediction is being effected at the outer margins of the array of FIG. 8, difference portions that are assigned to nonexistent continuous tone values are ignored. The resulting binary predicted values are stored in memory together with the difference portions to be diffused to values in the eighth row to be converted to predicted binary values in a later portion of the process.

In order to improve the visual appearance of the final reproduced image, random thresholding, wherein continuous tone values are compared with random members produced by a random number generator between zero and 255, for example, can be used in the initial prediction of binary values for the continuous tone values in portion 18$b$. Thus, while a threshold of 128 might be used to predict a binary value for one continuous tone value, a threshold of 196 or a threshold of 114 may be used to predict the binary value for the next continuous tone value.

Furthermore, while the initial prediction is accomplished in a back and forth fashion, (called "serpentine rastering"), it should be noted that a left-to-right rastering technique could alternatively be used. In this case, prediction proceeds of using the diffusion pattern 8 only from left-to-right, and not right-to-left. Prediction could alternatively proceed from right-to-left only, if desired, in which case only the diffusion pattern 9 is used.

Following prediction of the values in the first seven rows to predicted binary values, matrix 18 of FIG. 4 is positioned with respect to the array of FIG. 8 so that the continuous tone value in location $c_{1,1}$ of FIG. 8 now appears at location $c_{4,4}$ of FIG. 4. Matrix 19 is filled with those predicted binary values corresponding to the continuous tone values in matrix 18. Conversion of the continuous tone value in location $c_{1,1}$ of FIG. 8 is then accomplished in the manner hereinafter described using the predicted binary values of matrix 19.

After the first continuous tone value in location $c_{1,1}$ of FIG. 8 has been converted to a corresponding binary value, such binary value is stored in memory and matrix 18 shifts one column to the right so that its center location $c_{4,4}$ of FIG. 4 is coincident with the location $c_{1,2}$ of FIG. 8. The matrix 19 likewise shifts bringing into its right-hand column the previously predicted binary values corresponding to the new continuous tone values in the righthand column of matrix 18. The remaining values of matrix 19 are consequently shifted one column to the left and, with one exception, are the previously predicted binary values corresponding to the continuous tone values in the first six columns of matrix 18. The lone exception is the binary value in location $b_{4,3}$, which is the binary value to which the continuous tone value in location $c_{1,1}$ of FIG. 8 was converted. Conversion of the continuous tone value in location $c_{1,2}$ of FIG. 8 is then accomplished using the new values in the matrix 19.

After the continuous tone value in location $c_{1,2}$ of FIG. 8 has been converted to a corresponding binary value, 30 such binary value is stored in memory and matrix 18 again shifts one column to the right so that its center location $c_{4,4}$ of FIG. 4 is coincident with the location $c_{1,3}$ of FIG. 8. The matrix 19 likewise shifts bringing into its right-hand column the previously predicted binary values corresponding to the new continuous tone values in the righthand column of matrix 18. Consequently, the remaining values of matrix 19 are shifted one column to the left and, with two exceptions, are the previously predicted binary values corresponding to the continuous tone values in the first six columns of matrix 18. In this case, the binary values in locations $b_{4,2}$ and $b_{4,3}$ are the binary values to which the respective continuous tone value in locations $c_{1,1}$ and $c_{1,2}$ were converted. Conversion of the continuous tone value in location $c_{1,3}$ of FIG. 8 is then accomplished.

Once the continuous tone value in location $c_{1,3}$ of FIG. 8 has been converted, the conversion process continues in the fashion noted above to sequentially convert the values in the locations $c_{1,4}$–$c_{1,7}$ to binary values. During each iteration of the conversion process in this and subsequent rows, the matrix 19 is filled with the already converted binary values corresponding to the values of matrix 18 and the predicted binary values corresponding to the remaining values of matrix 18. More specifically, the matrix portion 19$a$ is, to the extent possible, filled with binary values resulting from the previous conversion of continuous tone values in the portion 18$a$ of matrix 18. When matrix portion 18$a$ includes one or more values that have not yet been converted to binary values, the predicted binary values are used to fill the corresponding locations in the matrix portion 19$a$.

When all of the continuous tone values in the first row of continuous tone values (i.e. those continuous tone values in locations $c_{1,1}$ to $c_{1,7}$ of FIG. 8) have been converted to binary values, the next continuous tone value to be converted is in location $c_{2,1}$ of FIG. 8. Since the conversion process uses the three rows above and below the row containing the continuous tone value undergoing conversion, and since row 8 was not previously converted to predicted binary values, it is necessary to do so at this time. This is accomplished using the error diffusion technique described previously and the stored difference portions generated during prediction of the first seven rows of continuous tone values. After prediction of binary values for the eighth row of the continuous tone values shown in FIG. 8, the resulting difference portions to be added to the values in the ninth row at a later point in the process are stored and conversion proceeds along row 2 in the fashion noted above. During conversion of row 2, the top two rows of portion 19$a$ of matrix 19 continue to include previously predicted binary values; however, the third row of portion 19$a$ initially contains predicted binary values in locations $b_{3,1} b_{3,2}$ and $b_{3,3}$ and binary values in locations $b_{3,4}$–$b_{3,7}$ obtained by conversion of the continuous tone values of $c_{1,1}$–$c_{1,4}$ of FIG. 8. As conversion proceeds along row 2, the third row of portion 19$a$ contains successively increasing numbers of already converted binary values and fewer predicted binary values until conversion of the value in location $c_{2,4}$ of FIG. 8 is undertaken. At this point, all values in the third row of portion 19$a$ are binary values resulting from previous conversion of continuous tone values.

The remainder of the process proceeds iteratively in a like manner, whereby, during each iteration, predicted binary values for continuing tone values in another row are derived, the resulting difference portions are stored and conversion of the continuous tone values in a row is effected.

Throughout the process, portion 19$b$ continues to be filled with predicted binary values located below and to the right of the location $b_{4,4}$ of the matrix 19. Also, the binary values in locations $b_{1,1}$–$b_{1,3}$, $b_{2,1}$–$b_{2,3}$, $b_{3,1}$–$b_{3,3}$ and $b_{4,1}$–$b_{4,3}$ are filled with predicted binary values when continuous tone values of the original at the lefthand edge of continuous tone values are being converted. As the conversion process moves away from this lefthand edge, these binary locations are filled with already converted binary values. A similar effect occurs when the righthand edge of the original is approached, in which case the locations $b_{1,5}-b_{1,7}$, $b_{2,5}-b_{2,7}$, and $b_{3,5}-b_{3,7}$ are increasingly filled with predicted binary values.

Figure 6B:
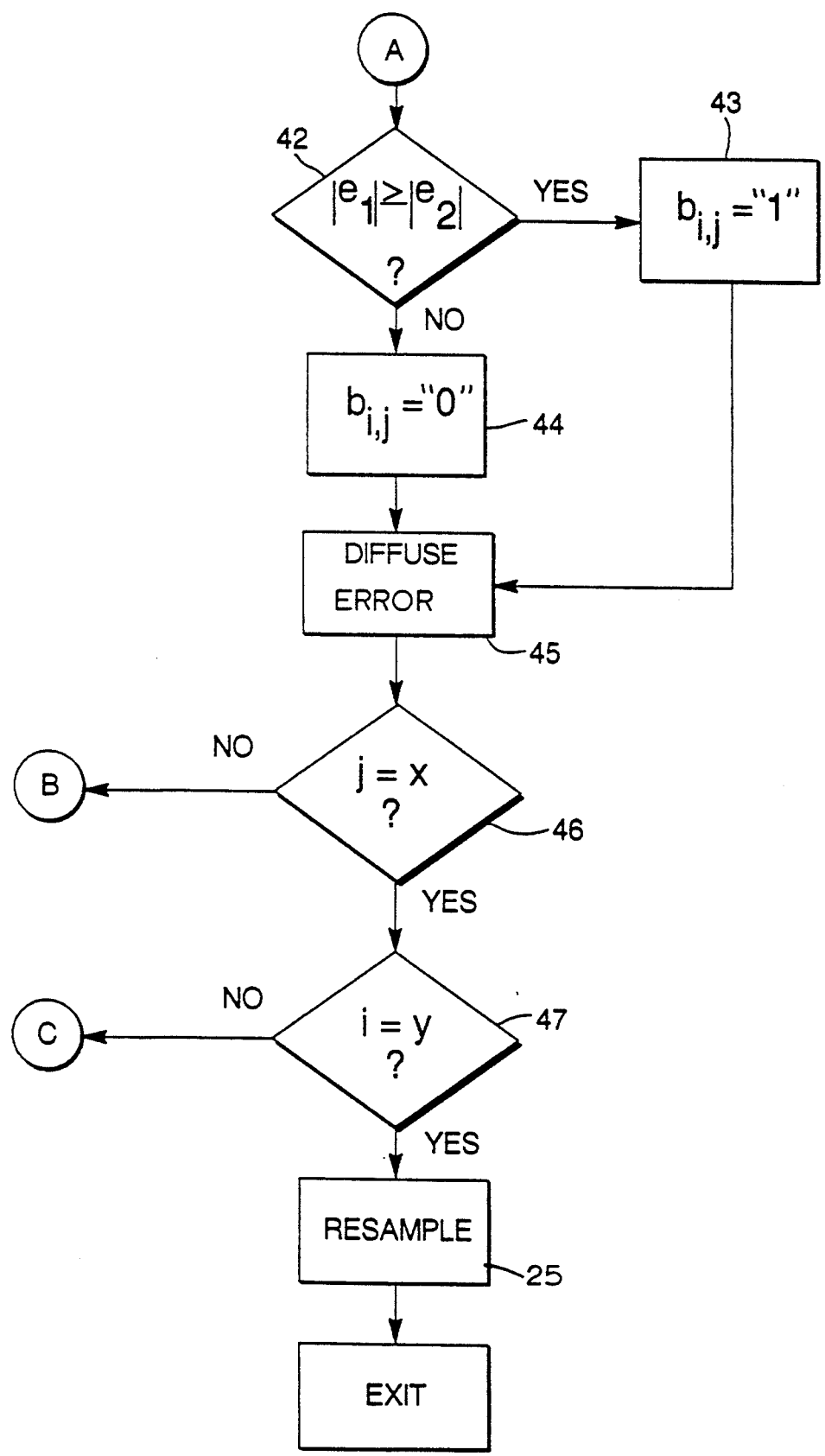

FIGS. 6A and 6B illustrate the process of the present invention in greater detail. In the preferred embodiment, continuous tone values have a value ranging from 0 to 255 while a binary value of "0" has an actual value of 0, and a binary value of "1" has an actual value of 255. The block 31 stores continuous tone values resulting from scanning an original. The block 22 corrects the color as described above and the block 23 resamples the stored continuous tone values in order to increase the number of such values per inch. Following these blocks, blocks 34–47 implement the functions performed by the screenless converter block 24 of FIG. 2. The block 34 duplicates the continuous tone values in the edge rows and columns as discussed in connection with FIG. 8 so that the continuous tone values representing boundary pixels can be converted with minimum visual errors at the boundaries of the reproduction. The block 35 sets a variable i to zero and the block 36 increments i by one. The block 37 sets a second variable j to zero and a block 38 increments the variable j by one. The variable i represents the row number and the variable j represents the column number for the continuous tone value in location $c_{i,j}$. These variables taken together determine which of the stored continuous tone values will be converted at this time.

The block 39 predicts and stores in memory binary values for matrix 19 as necessary. As discussed above, the block 39 initially predicts and stores in memory binary values for the first seven rows of continuous tone values and selects the appropriate values to fill the matrix 19 as needed for conversion of each value $c_{i,j}$. Subsequently, the binary values for other rows are predicted and stored on a row-by-row basis.

The block 40 determines a first error by subtracting three quantities from the $c_{i,j}$ continuous tone value undergoing conversion. The first quantity is obtained by summing the products resulting from multiplying each binary value of portion 19a of matrix 19 by a corresponding filter value from portion 20a of filter 20. Thus, the binary value in location $b_{1,1}$ is multiplied by $w_{1,1}$ and the result is added to the result obtained when the binary value in location $b_{1,2}$ is multiplied by $w_{1,2}$ and so on. This first quantity is, thus, a retrospective spatial view at those neighboring, converted binary values which are in visual proximity to the location that will contain the binary value corresponding to the continuous tone value undergoing conversion. The second quantity represents the product of an assumed binary value of "zero" for the continuous tone value undergoing conversion and the filter value $w_{4,4}$ (since this product is always equal to zero, this step can be omitted—it is only presented here to assist in understanding the conversion process). The third quantity is obtained by summing the products resulting from multiplying each binary value of portion 19b of matrix 19 (i.e. those predicted binary values corresponding to continuous tone values which have not yet been converted) by a corresponding filter value from portion 20b of filter 20. This second quantity is, thus, a prospective or predicted spatial view of those neighboring binary values which are in visual proximity to the location that will contain the binary value corresponding to the continuous tone value undergoing conversion.

The block 41 determines a second error in the same manner, except that an assumed binary value of "one" is assigned to the continuous tone value undergoing conversion, which assumed binary value is multiplied by filter value $w_{4,4}$.

A decision block 42 compares the two errors. If the absolute value of the first error is greater than, or equal to, the absolute value of the second error, then a block 43 converts the continuous tone value undergoing conversion to a binary value of "1". If the magnitude of the first error is not larger than the magnitude of the second error, then a block 44 converts the continuous tone value undergoing conversion to a binary value of "zero". After the conversion of the continuous tone value in location $c_{i,j}$, the error (either $e_1$ or $e_2$) corresponding to the selected output value is diffused by block 45 using pattern 8 of FIG. 5.

A test is then made by a decision block 46 to determine whether all continuous tone values in the current row of stored continuous tone values have been converted ("x" being the total number of columns of stored continuous tone values). If not, the process returns through point (B), where the value of j is incremented by block 38. No additional binary values need to be predicted at this point. The conversion process is then repeated to convert the next continuous tone value in the row. After all of the continuous tone values in the current row have been converted, a test is made by decision block 47 to determine whether all continuous tone values in all rows have been converted ("y" being the total number of rows of stored continuous tone values). If not, the process returns through point (C) where the value of i is incremented by the block 36, the variable j is reset to 0 by the block 37 and incremented by 1 by the block 38. Since, as discussed above, the conversion process has dropped to the second row of continuous tone values, the block 39 converts row 8 of the continuous tone values to predicted binary values in order to have sufficient values to fill portion 19b of matrix 19. After the values of row 8 are predicted, the conversion process is undertaken for the first continuous tone value in the second row, and so on.

After the process of converting all continuous tone values to corresponding half-tone binary values has been completed, these values can be resampled by the block 25, such as by pixel duplication, if the dot resolution still needs to be increased in order to match the resolution of the marking device. For example, the resolution of the binary values as a result of screenless conversion may be on the order of 750 dots per inch whereas the marking device may have a resolution of 1500 or more dots per inch. The resampling employed by block 25 may simply create additional bit positions in the final binary value array and duplicate each bit position of the binary value array one place to the right and one place down.

By way of example, if the binary values resulting from screenless conversion by block 24 are as shown in columns A, C, E, G, and I and rows 1, 3, 5, 7, and 9 of FIG. 9, resampler 25 will create the new bit positions shown in columns B, D, F, H, and J and rows 2, 4, 6, 8, and 10, and will duplicate each binary value by placing the same binary value in the adjacent bit position to the right. Thus, a one is placed in position B1, a zero in position D1, a one in position F1, a one in position H1, and a zero in position J1. Then the values in row 1 are also duplicated into corresponding bit positions of row 2 directly below. Thus, a one is placed in positions A2 and B2, a zero in positions C2 and D2, a one in positions E2 and F2, a one in positions G2 and H2, and a zero in positions I2 and J2. The other binary values are similarly duplicated. Accordingly, FIG. 10 shows the completed array resulting from the duplication of the array shown in FIG. 9. The result of duplication 25 is then applied to bit wise merger block 28 of FIG. 2. The line work information may also be applied directly to bit wise merger block 28 or may alternatively be digitally resampled by a block 26 if its resolution needs to be increased and screenlessly converted by block 27 (identical to block 24) in order to improve the visual appearance of the line work. The resulting bit map can then be used by film plotter 14 for plotting film or can be used directly to form printing plates.

As described above, the decision as to whether to convert a continuous tone value to one binary value or another depends upon a comparison of the magnitude of errors of $e_1$ and $e_2$. This comparison is equivalent to comparing the error $e_1$ to "1"($w_{4,4}$/2) such that, if the error $e_1$ is greater than "1"($w_{4,4}$/2), the continuous tone value is converted to a binary "1" and, if the error $e_1$ is less than "1"($w_{4,4}$/2), the continuous tone value is converted to a binary "0", it being remembered that a binary "1" is actually a digital value of 255.

While the screenless conversion system described in detail above converts a continuous tone value into an output value having only one of two possible levels (a "0" or a "1"), and thus produces a half-tone "binary" value, it should be noted that the continuous tone value may instead be converted into an output value having more than two possible levels. In fact, the present system can be used to convert a continuous tone value having at least M possible levels (such as a continuous tone value having one of 256 possible levels or such as an analog value) to an output value having N possible levels, where M is greater than N.

In converting a continuous tone value to an output value having more than two possible levels, an error is generated for each possible level of the output value. For example, if the output value can have three possible levels, a first error is generated based upon: (1) at least one continuous tone value which has already been converted or predicted; (2) at least one continuous tone value yet to be converted; and (3) an output value assumed to have the first possible level. A second error is generated based upon: (1) at least one continuous tone value which has already been converted or predicted; (2) at least one continuous tone value yet to be converted; and (3) an output value assumed to have the second possible level. A third error is generated based upon: (1) at least one continuous tone value which has already been converted; (2) at least one continuous tone value yet to be converted; and (3) an output value assumed to have the third possible level. The three errors are compared and the continuous tone value is converted to the output value resulting in the smallest error magnitude.

When filter 20 is used in the conversion process as described above, its values are applied to the output values corresponding to continuous tone values which have already been converted or predicted, to output values corresponding to continuous tone values yet to be converted, and to output values assumed to have each of the three possible levels. The prediction process may use all of the levels possible for the output values or may use only two levels or any other number of levels even though continuous tone values are being converted to output values having more than two possible levels. The diffusion process, both after each continuous tone value is converted and during the prediction process, remains unaffected by the number of possible levels for the output value.

Continuous tone values may be generated by devices other than a scanner. For example, in FIG. 11, a descreener 71, such as the Model CN420 descreening scanner manufactured by Linotype-Hell of Germany, generates continuous tone values which are supplied to processor 72. The processor 72 converts these continuous tone values into output values which can be used by marking device 73 to plot film or to directly form printing plates in the manner described in connection with FIGS. 1A and 1B. The descreener 71 scans a separation which has been previously prepared (such as by a halftoning process) and integrates the elementary plotter marks on the separation to generate continuous tone values. The processor 72 can convert these continuous tone values into output values using the process described in FIGS. 6A and 6B. One of the primary advantages of the system shown in FIG. 11 is that a regularly screened separation can be converted, using the process disclosed herein, into a screenless separation thereby improving the quality of the reproduction.

Figure 11:
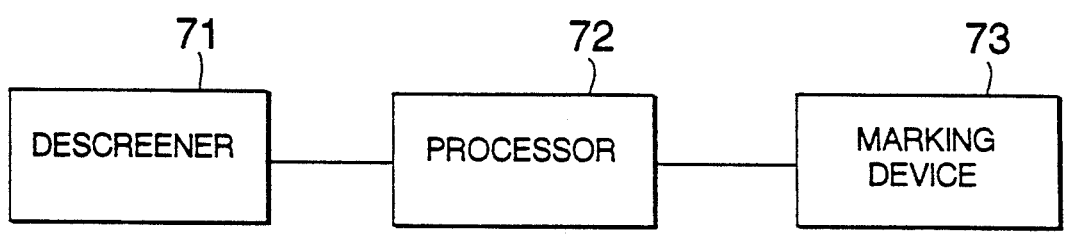
FIG. 11 shows a block diagram illustrating the use of the screenless conversion system according to the present invention in connection with a descreener.
Figure 12:
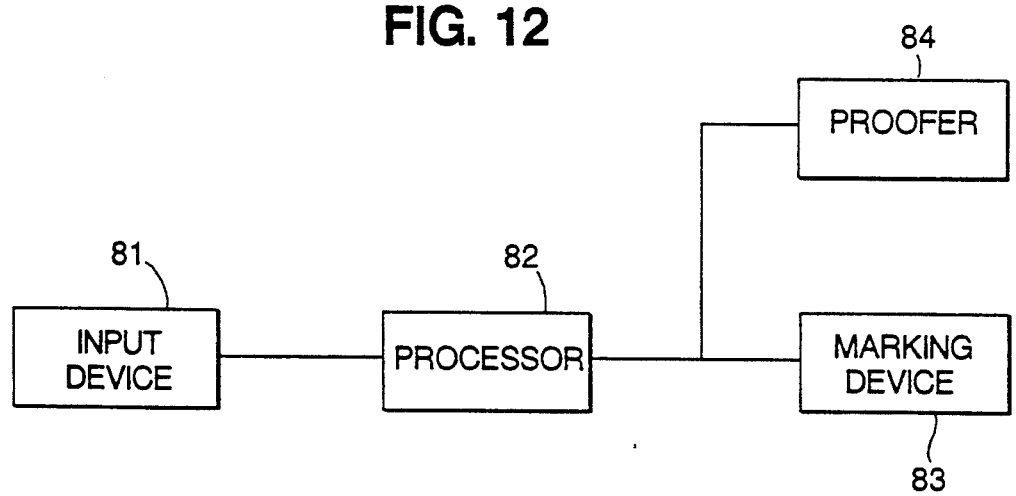
FIG. 12 shows a block diagram illustrating the use of the screenless conversion system according to the present invention in connection with a proofer.

In FIG. 12, an input device 81, which may be the descreener 71 of FIG. 11 or the scanner 11 of FIGS. 1A or 1B, supplies continuous tone values to a processor 82. The processor 82 converts these continuous tone values into output values which can be used by a marking device 83 to plot film or to directly form printing plates in the manner described in connection with FIGS. 1A and 1B. The processor 82 converts these continuous tone values into output values using the process described in FIGS. 6A and 6B. A proofer 84 can receive the output values from processor 82 in order to allow an operator to make a proof and any final adjustments before creating a final proof to be used as a standard during the printing of reproductions. One of the primary advantages of the system shown in FIG. 12 is that the proofer 84 can use the output values directly in order to proof the reproduction. The proofer 84 should operate at the same dots per inch as the output values. Furthermore, the color correction parameters used in color corrector 22 will be different in the case of a proofer than in the case of a press. In the case of a proofer, the correction parameters will depend upon the characteristics of the proofer; but in the case of a press, the correction parameters will depend upon ink, paper and marking device characteristics.

Other variations will be apparent to one skilled in the art without departing from the scope of the present invention.

We claim:

1. A system for converting input values into output values, each of said input values having one of at least M possible levels and each of said output values having one of N possible levels, where M is greater than N, said system converting, in turn, each of said input values into a corresponding output value so that, at a given instant in time, an input value undergoing conversion has before it previously converted input values and after it input values yet to be converted, said system comprising:

error generating means for generating at least first and second errors for said input value undergoing conversion, said first error being based upon an output value corresponding to a previously converted input value, based upon an output value estimated from a corresponding input value yet to be converted, and based upon an output value having a first level assumed for said input value undergoing conversion, and said second error being based upon an output value corresponding to a previously converted input value, based upon an output value estimated from a corresponding input value yet to be converted, and based upon an output value having a second level assumed for said input value undergoing conversion;

output value setting means for setting said input value undergoing conversion to an output value having said first level if the absolute value of said first error is less than the absolute value of said second error or to an output value having said second level if the absolute value of said first error is greater than the absolute value of said second error; and, diffusing means for diffusing, to a selected number of said input values yet to be converted, said first error if said input value undergoing conversion is set to said output value having said first level or said second error if said input value undergoing conversion is set to said output value having said second level.

2. The system of claim 1 wherein said error generating means predicts an output value for said input value yet to be converted by comparing said input value yet to be converted to a threshold, by converting said input value yet to be converted to a predicted output value having said first level or to a predicted output value having said second level depending upon whether said input value yet to be converted is below or above said threshold, and by diffusing the difference between said input value yet to be converted and said corresponding predicted output value to a subsequent predetermined number of input values yet to be converted.

3. The system of claim 2 wherein said threshold is a random threshold.

4. The system of claim 2 wherein said error generating means diffuses said difference between said input value yet to be converted and said corresponding predicted output value in a serpentine manner.

5. The system of claim 2 wherein said error generating means comprises digital resampling means for increasing said number of input values.

6. The system of claim 1 wherein said error generating means comprises digital resampling means for increasing said number of input values.

7. A system for converting continuous tone values into corresponding output values, said system converting, in turn, each of said continuous tone values to a corresponding output value so that, at a given instant in time, a continuous tone value undergoing conversion has before it previously converted continuous tone values and after it continuous tone values yet to be converted, said system comprising:

error generating means for generating first and second errors for said continuous tone value undergoing conversion, said first error being based upon a first set of output values multiplied by a first set of corresponding filter values wherein each output value of said first set of output values corresponds to a continuous tone value in a first set of previously converted continuous tone values, (b) a second set of output values multiplied by a second set of corresponding filter values wherein each output value of said second set of output values is predicted from a corresponding continuous tone value in a second set of continuous tone values yet to be converted, and (c) an output value having an assumed first level multiplied by a corresponding filter value, and said second error being based upon (a) said first set of output values multiplied by said first set of corresponding filter values, (b) said second set of output values multiplied by said second set of corresponding filter values, and (c) an output value having an assumed second level multiplied by said corresponding filter value;

output value setting means for setting said continuous tone value undergoing conversion to said output value having said first level if the absolute value of said first error is less than the absolute value of said second error or to said output value having said second level if the absolute value of said first error is greater than the absolute value of said second error; and, diffusing means for diffusing, to a predetermined number of said continuous tone values yet to be converted, said first error if said continuous tone value undergoing conversion is set to said output value having said first level or said second error if said continuous tone value undergoing conversion is set to said output value having said second level.

8. The system of claim 7 wherein said error generating means predicts, one at a time, each output value of said second set of output values (a) by comparing a continuous tone value in said second set of continuous tone values, to a threshold, (b) by converting said continuous tone value in said second set of continuous tone values, to a predicted output value having said first level or to a predicted output value having said second level depending upon whether said continuous tone value in said second set of continuous tone values, is below or above said threshold, and (c) by diffusing the difference between said continuous tone value in said second set of continuous tone values, and said corresponding predicted output value to a selected number of subsequent continuous tone values in said second set of continuous tone values.

9. The system of claim 8 wherein said threshold is a random threshold.

10. The system of claim 8 wherein said error generating means diffuses, in a serpentine manner, said difference between said continuous tone value in said second set of continuous tone values and said corresponding predicted output value to a selected number of subsequent continuous tone values in said second set of continuous tone values.

11. The system of claim 8 wherein said error generating means generates said first error for said continuous tone value undergoing conversion by subtracting, from said continuous tone value undergoing conversion, (a) each product resulting from multiplying each output value of said first set of output values by a corresponding filter value from said first set of filter values, (b) each product resulting from multiplying each output value of said second set of output values by a corresponding filter value from said second set of filter values, and (c) said output value having said assumed first level multiplied by a corresponding filter value, and wherein said error generating means generates said second error for said continuous tone value undergoing conversion by subtracting, from said continuous tone value undergoing conversion, (a) said each product resulting from multiplying each output value of said first set of output values by a corresponding filter value from said first set of filter values, (b) said each product resulting from multiplying each output value of said second set of output values by a corresponding filter value from said second set of filter values, and (c) said output value having said assumed second level multiplied by a corresponding filter value.

12. The system of claim 8 wherein said error generating means comprises digital resampling means for increasing said number of continuous tone values.

13. The system of claim 7 wherein said error generating means generates said first error for said continuous tone value undergoing conversion by subtracting, from said continuous tone value undergoing conversion, (a) each product resulting from multiplying each output value of said first set of output values by a corresponding filter value from said first set of filter values, (b) each product resulting from multiplying each output value of said second set of output values by a corresponding filter value from said second set of filter values, and (c) said output value having said assumed first level multiplied by a corresponding filter value, and wherein said error generating means generates said second error for said continuous tone value undergoing conversion by subtracting, from said continuous tone value undergoing conversion, (a) said each product resulting from multiplying each output value of said first set of output values by a corresponding filter value from said first set of filter values, (b) said each product resulting from multiplying each output value of said second set of output values by a corresponding filter value from said second set of filter values, and (c) said output value having said assumed second level multiplied by a corresponding filter value.

14. The system of claim 7 wherein said error generating means comprises digital resampling means for increasing said number of continuous tone values.

15. A method of converting input values to corresponding output values, each of said input values having one of at least M possible levels and each of said output values having one of N possible levels, where M is greater than N, said method comprising the following steps:

(a) multiplying each output value of a first set of output values by a corresponding filter value from a first set of filter values wherein each output value of said first set of output values corresponds to an input value in a first set of previously converted input values;

(b) predicting a second set of output values wherein each output value of said second set of output values corresponds to an input value in a second set of input values yet to be converted;

(c) multiplying each output value of said predicted second set of said output values by a corresponding filter value from a second set of filter values;

(d) multiplying a filter value corresponding to an input value undergoing conversion by an output value having an assumed first level;

(e) multiplying said filter value corresponding to said input value undergoing conversion by an output value having an assumed second level;

(f) providing a first error by subtracting the results of steps (a), (c) and (d) from said input value undergoing conversion;

(g) providing a second error by subtracting the results of steps (a), (c) and (e) from said input value undergoing conversion;

(h) converting said input value undergoing conversion to an output value having said first level if the absolute value of said first error is smaller than the absolute value of said second error;

(i) converting said input value undergoing conversion to an output value having said second level if the absolute value of said first error is greater than the absolute value of said second error;

(j) diffusing, to a predetermined number of said input values yet to be converted, said first error if said input value undergoing conversion is converted to said output value having said first level or said second error if said input value undergoing conversion is converted to said output value having said second level; and (k) repeating steps (a)–(j) for each of the input values yet to be converted.

16. The method of claim 15 wherein said step of predicting said second set of output values comprises the step of predicting, one at a time, each output value of said second set of output values by (i) comparing a corresponding input value in said second set of input values to a threshold, (ii) converting said corresponding input value in said second set of input values to a predicted output value having said first level or to a predicted output value having said second level depending upon whether said corresponding input value in said second set of input values is below or above said threshold, and (iii) diffusing the difference between said corresponding input value in said second set of input values and the resulting predicted output value to a subsequent predetermined number of input values in said second set of input values.

17. The method of claim 16 wherein said step of comparing said corresponding input value in said second set of input values to a threshold comprises the step of comparing said corresponding input value in said second set of input values to a random threshold.

18. The method of claim 16 wherein said step of diffusing the difference between said corresponding input value in said second set of input values and said resulting predicted output value to a subsequent predetermined number of said input values in said second set of input values comprises the step of diffusing, in a serpentine manner, the difference between said corresponding input value in said second set of input values and said resulting predicted output value to a subsequent predetermined number of said input values in said second set of input values.

19. The method of claim 16 further comprising the step of increasing said number of input values.

20. The method of claim 15 further comprising the step of increasing said number of input values.

21. A method of converting continuous tone values to corresponding output values such tat, at a given time during conversion, said continuous tone values include continuous tone values already converted, a continuous tone value undergoing conversion, and continuous tone values yet to be converted, said method comprising the following steps:

(a) deriving a first error based upon an output value corresponding to a continuous tone value already converted, based upon an output value predicted rom a continuous toe value yet to be converted, and based upon an output value having a first level assumed for said continuous tone value undergoing conversion;

(b) deriving a second error based upon said output value corresponding to said continuous tone value already converted, based upon said output value predicted form said at least on continuous tone value yet to be converted, and based upon an output value having a second level assumed for said continuous tone value undergoing conversion;

(c) converting said continuous tone value undergoing conversion to said output value having said first level if the absolute value of said first error is smaller than the absolute value of said second error or to said output value having said second level if the absolute value of said first error is greater than the absolute value of said second error.

(d) diffusing, to a predetermined number of said continuous tone values yet to be converted, said first error if said continuous tone value undergoing conversion is converted to said output value having said first level or said second error if said continuous tone value undergoing conversion is converted to said output value having said second level;

(e) repeating steps (a)-(d) for each of said continuous tone values yet to be converted.

22. The method of claim 21 wherein said step of deriving said first error and said step of deriving said second error include the step of predicting said output value predicted from said continuous tone value yet to be converted by comparing said continuous tone value yet to be converted to a threshold, by converting said continuous tone value yet to be converted to a predicted output value having a first level or to a predicted output value having a second level depending upon whether said continuous tone value yet to be converted is below or above said threshold, and by diffusing the difference between said continuous tone value yet to be converted and said corresponding predicted output value to a predetermined, subsequent number of continuous tone values yet to be converted.

23. The method of claim 22 wherein said step of predicting said output value predicted from said continuous tone value yet to be converted includes the step of comparing each of said continuous tone values yet to be converted to a random threshold.

24. The method of claim 22 wherein said step of predicting said output value predicted from said continuous tone value yet to be converted comprises the step of diffusing, in a serpentine manner, the difference between said continuous tone value yet to be converted and said corresponding predicted output value to a predetermined, subsequent number of continuous tone values yet to be converted.

25. The method of claim 22 further comprising the step of increasing said number of continuous tone values.

26. The method of claim 21 further comprising the step of increasing said number of continuous tone values.

27. A system for plotting dots on a film in response to continuous tone values generated by scanning an image to be reproduced, said system comprising:

screenless conversion means for converting, said continuous tone values to corresponding output values wherein a continuous tone value undergoing conversion is converted by the use of predicted output values and converted output values in a symmetrical region surrounding said continuous tone value undergoing conversion; and, film plotting means for plotting dots onto a film in response to said output values, said dots representing an image to be reproduced.

28. The system of claim 27 wherein said screenless conversion means comprises value conversion means for converting each continuous tone value to a corresponding output value by (a) determining first and second errors based upon output values having corresponding first and second levels assumed for a continuous tone value undergoing conversion, (b) converting said continuous tone value undergoing conversion, (b) converting said continuous tone value undergoing conversion to an output value having said first level if the absolute value of said first error is less than the absolute value of said second error or to an output value having said second level f the absolute value of said first error is greater than the absolute value of said second error, and (c) diffusing , to a predetermined number of continuous tone values yet to be converted, said first error if said continuous tone value undergoing conversion is converted to said output value having said first level or said second error if said continuous tone value undergoing conversion is converted to said output value having said second level.

29. The system of claim 28 wherein said screenless conversion means comprises digital resampling means for increasing said number of continuous tone values.

30. The system of claim 27 wherein said screenless conversion means comprises (a) error generating means for generating a first error based upon output values corresponding to a selected number of previously converted continuous tone values, based upon output values predicted from a selected number of continuous tone values yet to be converted, and based upon an output value having a first level assumed for a continuous tone value undergoing conversion and for generating a second error based upon said output values corresponding to said selected number of previously converted continuous tone values, based said upon output values predicted from said selected number of continuous tone values yet to be converted, and based upon an output value having a second level assumed for said continuous tone value undergoing conversion, (b) output value setting means for setting said continuous tone value undergoing conversion to said output value having said first level if the absolute value of said first error is less than the absolute value of said second error or to said output value having said second level if the absolute value of said first error is greater than the absolute value of said second error, and (c) diffusing means for diffusing, to a predetermined number of continuous tone values yet to be converted, said first error if said continuous tone value undergoing conversion is set to said output value having said first level or said second error if said continuous tone value undergoing conversion is set to said output value having said second level.

31. The system of claim 30 wherein said error generating means predicts, one at a time, output values form said selected number of continuous tone values yet to be converted by comparing a continuous tone value of said selected number of continuous tone values yet to be converted to a threshold, by converting said continuous tone value of said selected number of continuous tone values yet to be converted to a predicted output value having said first level or to a predicted output value having said second level depending upon whether said corresponding continuous tone value of said selected number of continuous tone values yet to be converted is below or above said threshold, and by diffusing the difference between said continuous tone value of said selected number of continuous tone values yet to be converted and the corresponding predicted output value to which it is converted to a subsequent predetermined number of said continuous tone values in said selected number of continuous tone values yet to be converted.

32. The system of claim 31 wherein said threshold is a random threshold.

33. The system of claim 31 wherein said error generating means diffuses said difference in a serpentine manner.

34. The system of claim 31 wherein said screenless conversion means comprises digital resampling means for increasing said number of continuous tone values.

35. The system of claim 27 wherein said screenless conversion means comprises digital resampling means for increasing said number of continuous tone values.

36. A system for forming printing plates directly from output values converted from continuous tone values generated by scanning an image to be reproduced, said system comprising:
screenless conversion means for converting each of said continuous tone values to a corresponding output value by (a) determining first and second errors based upon output values having first and second levels respectively assumed for a continuous tone value undergoing conversion, (b) converting said continuous tone value undergoing conversion to an output value having said first level fi the absolute value of said first error is less than the absolute value of said second error or to an output value having said second level if the absolute value of said first error is greater than the absolute value of said second error, and (c) diffusing, to a predetermined number of continuous tone values yet to be converted, said first error if said continuous tone value undergoing conversion is converted to said output value having said first level or said second error if said continuous tone value undergoing conversion is converted to said output value having said second level; and
plate forming means for forming said printing plates directly from said output values.

37. The system of claim 36 wherein said screenless conversion means comprises digital resampling means for increasing said number of continuous tone values.

38. The system of claim 36 wherein said screenless conversion means comprises error generating means for generating said first error based upon output values corresponding to a selected number of previously converted continuous tone values, based upon output values estimated from a selected number of continuous tone values yet to be converted, and based upon an output value having said first level assumed for said continuous tone value undergoing conversion and for generating said second error based upon said output values corresponding to said selected number of previously converted continuous tone values, based upon said output values estimated from said selected number of continuous tone values yet to be converted, and based upon an output value having said second level assumed for said continuous tone value undergoing conversion.

39. The system of claim 38 wherein said error generating means predicts, one at a time, output values from said selected number of continuous tone values yet to be converted by comparing a continuous tone value of said selected number of continuous tone values yet to be converted to a threshold, by converting said continuous tone value of said selected number of continuous tone values yet to be converted to a predicted output value having said first level or to a predicted output value having said second level depending upon whether continuous tone value of said selected number of continuous tone values yet to be converted is below or above said threshold, and by diffusing the difference between said continuous tone value of said selected number of continuous tone values yet to be converted and the corresponding predicted output value to which it is converted to a subsequent predetermined number of said selected number of continuous tone values yet to be converted.

40. The system of claim 39 wherein said threshold is a random threshold.

41. The system of claim 39 wherein said error generating means diffuses said difference in a serpentine manner.

42. The system of claim 39 wherein said random screening means comprises digital resampling means for increasing said number of continuous tone values.

43. The system of claim 36 wherein said random screening means comprises digital resampling means for increasing said number of continuous tone values.

44. A screenless conversion method of converting regularly scanned data into output values comprising the following steps:
(a) descreening said regularly screened data into continuous tone values;
(b) determining, for a continuous tone value undergoing conversion, first and second errors based upon output values having corresponding first and second levels assumed for said continuous tone value undergoing conversion;
(c) converting said continuous tone value undergoing conversion to an output value having said first level if the absolute value of said first error is less than the absolute value of said second error or to an output value having said second level if the absolute value of said first error is greater than the absolute value of said second error; and,
(d) diffusing, to a predetermined number of continuous tone values yet to be converted, said first error if said continuous tone value undergoing conversion is converted to said output value having said first level or said second error if said continuous tone value undergoing conversion is converted to said output value having said second level.

45. The method of claim 44 wherein said step of converting said plurality of continuous tone values to output values by the use of error diffusion comprises the step of increasing said number of continuous tone values.

46. The method of claim 44 wherein said step of determining first and second errors comprises the steps of (a) generating said first error based upon output values corresponding to a selected number of previously converted continuous tone values, based upon output vales predicted from a selected number of continuous tone values yet to be converted, and based upon an output value having said first level assumed for said continuous tone value undergoing conversion, and (b) generating said second error based upon said output values corresponding to said selected number of previously converted continuous tone values, based upon said output values predicted from said selected number of continuous tone values yet to be converted, and based upon an output value having said second level assumed for said continuous tone value undergoing conversion.

47. The method of claim 46 wherein said step of converting said continuous tone value undergoing conversion comprises the step of predicting, one at a time, output values for said selected number of continuous tone values yet to be converted by comparing continuous tone value of said selected number of continuous tone values yet to be converted to a threshold, by converting said continuous tone value of said selected number of continuous tone values yet to be converted to a predicted output value having said first level or to a predicted output value having said second level depending upon whether said continuous tone value of said selected number of continuous tone values yet to be converted is below or above said threshold, and by diffusing the difference between said continuous tone value of said selected number of continuous tone values yet to be converted and the corresponding predicted output value to which it is converted to a subsequent predetermined number of said selected number of continuous tone values yet to be converted.

48. The method of claim 47 wherein said step of predicting, one at a time, output values for said selected number of continuous tone values yet to be converted comprises the step of comparing said continuous tone value of said selected number of continuous tone values yet to be converted to a random threshold.

49. The method of claim 47 wherein said step of predicting, one at a time, output values for said selected number of continuous tone values yet to be converted comprises the step of diffusing said difference in a serpentine manner.

50. The method of claim 46 wherein said step of converting said plurality of continuous tone values to output values by the use of error diffusion comprises the step of increasing said number of continuous tone values.

51. The method of claim 46 wherein said step of descreening said regularly screened data into a plurality of continuous tone values comprises the step of scanning said regularly screened data and integrating said regularly screened data to produce said plurality of continuous tone values.

52. A reproduction system comprising:
input means for providing continuous tone values based upon an original to be reproduced;
screenless conversion means for converting each of said continuous tone values into a corresponding output value by (a) determining first and second errors based upon output values having corresponding first and second levels assumed for a continuous tone value undergoing conversion, (b) converting said continuous tone value undergoing conversion to an output value having said first level if the absolute value of said first error is less than the absolute value of said second error or to an output value having said second level if the absolute value of said first error is greater than the absolute value of said second error, and (c) diffusing, to a predetermined number of continuous tone values yet to be converted, said first error if said continuous tone value undergoing conversion is converted to said output value having said first level or said second error if said continuous tone value undergoing conversion is converted to said output value having said second level; and
proofing means for proofing said output values to ensure that said output values represent a desired reproduction of said original.

53. The system of claim 52 wherein said output values have a resolution selected to match a resolution at which said proofing means operates.

54. The system of claim 52 wherein said screenless conversion means comprises digital resampling means for increasing said number of continuous tone values.

55. The system of claim 52 wherein said screenless conversion means comprises error generating means for generating said first error based upon output values corresponding to a selected number of previously converted continuous tone values, based upon output values predicted from a selected number of continuous tone values yet to be converted, and based upon an output value having said first level assumed for said continuous tone value undergoing conversion and for generating said second error based upon said output values corresponding to said selected number of previously converted continuous tone values, based upon said output values predicted from said selected number of continuous tone values yet to be converted, and based upon an output value having said second level assumed for said continuous tone value undergoing conversion.

56. The system of claim 55 wherein said error generating means predicts, one at a time, output values for said selected number of continuous tone values yet to be converted by comparing a continuous tone value of said selected number of continuous tone values yet to be converted to a threshold, by converting said continuous tone value of said selected number of continuous tone values yet to be converted to a predicted output value having said first level or to a predicted output value having said second level depending upon whether said continuous tone value of said selected number of continuous tone values yet to be converted is below or above said threshold, and by diffusing the difference between said continuous tone value of said selected number of continuous tone values yet to be converted and the corresponding predicted output value to which it is converted to a subsequent predetermined number of said selected number of continuous tone values yet to be converted.

57. The system of claim 56 wherein said threshold is a random threshold.

58. The system of claim 56 wherein said error generating means diffuses said difference in a serpentine manner.

59. The system of claim 56 wherein said screenless conversion means comprises digital resampling means for increasing said number of continuous tone values.

60. The system of claim 55 wherein said output values have a resolution selected to match a resolution at which said proofing means operates.

* * * * *

UNITED STATES PATENT AND TRADEMARK OFFICE
CERTIFICATE OF CORRECTION

PATENT NO. : 5,331,430
DATED : July 19, 1994
INVENTOR(S) : Zhenhua Xie, et al

It is certified that error appears in the above-indentified patent and that said Letters Patent is hereby corrected as shown below:

Column 9, line 60, delete "30".

Column 10, line 47, "$b_{3,1}b_{3,2}$" should be --$b_{3,1},b_{3,2}$--.

Column 15, claim 7, line 64, between "upon" and "a", insert --(a)--.

Column 18, claim 21, line 61, "tat" should be --that--.

Column 19, claim 21, line 2, "rom" should be --from--;
"toe" should be --tone--;
line 9, "form" should be --from--;
"on" should be --one--.

Column 20, claim 28, lines 15-16, delete "(b) converting said continuous tone value undergoing conversion,".

Column 21, claim 36, line 36, "fi" should be --if--.

Signed and Sealed this

Tenth Day of January, 1995

Attest:

BRUCE LEHMAN

Attesting Officer     Commissioner of Patents and Trademarks